United States Patent [19]

Purcupile et al.

[11] 4,008,598

[45] * Feb. 22, 1977

[54] WORK REDUCING

[75] Inventors: John Charles Purcupile, Monroeville; Martin J. Dempsey, Bethel Park; Selwyn Raymond Rackoff, Pittsburgh, all of Pa.

[73] Assignee: Asko, Inc., West Homestead, Pa.

[*] Notice: The portion of the term of this patent subsequent to Feb. 22, 1994, has been disclaimed.

[22] Filed: Nov. 13, 1975

[21] Appl. No.: 631,635

[52] U.S. Cl. .................................. 72/237; 29/125; 72/238

[51] Int. Cl.² .................................. B21B 31/08

[58] Field of Search .................. 72/249, 237, 238; 403/31, 36; 29/125, 130, 113 R, 123; 279/10, 2; 85/32 T; 151/14 R; 92/93, 101, 103 M, 96, 98 R

[56] References Cited

UNITED STATES PATENTS

| | | | |
|---|---|---|---|
| 2,446,694 | 8/1948 | Dickson | 92/93 X |
| 3,362,733 | 1/1968 | Klara | 403/31 |
| 3,398,563 | 8/1968 | Jones et al. | 72/221 |
| 3,486,776 | 12/1969 | LeBaron | 403/31 |
| 3,613,429 | 10/1971 | Schwarzenberg et al. | 72/249 |
| 3,787,943 | 1/1974 | Loqvist | 29/125 |
| 3,793,869 | 2/1974 | Hufnagl | 29/125 |
| 3,851,365 | 12/1974 | Oxlade | 29/125 |
| 3,902,233 | 9/1975 | Ohtsu | 29/125 |

Primary Examiner—Milton S. Mehr
Attorney, Agent, or Firm—Hymen Diamond

[57] ABSTRACT

A roll assembly for reducing rod and the like in which the rolls are secured against rotation on their arbor by force applied to the sides of the rolls in the direction of the axis of the arbor. The force is applied by an hydraulic nut or annulus having a cavity which is sealed pressure tight by a deformable membrane. An annular shoe is interposed between the membrane and the rolls. The cavity is supplied with fluid under pressure and is deflected exerting force on the shoe which is transmitted to the roll.

10 Claims, 14 Drawing Figures

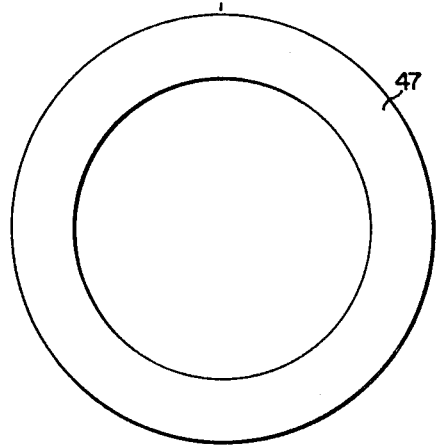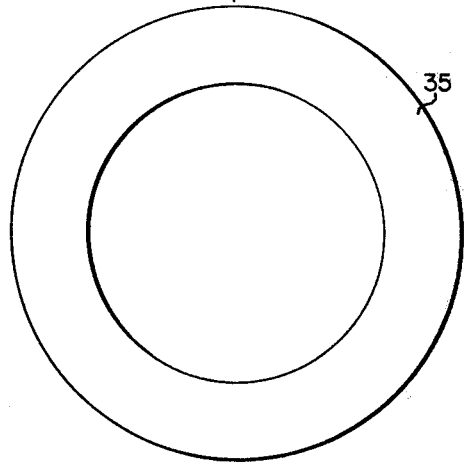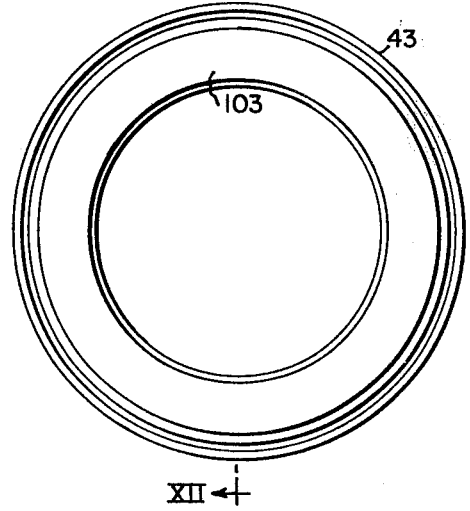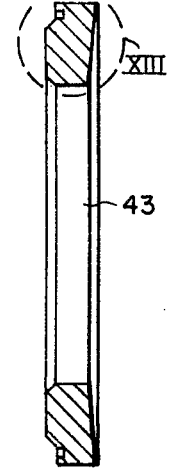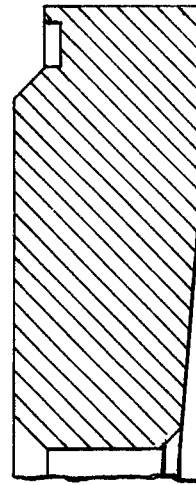

WORK REDUCING

BACKGROUND OF THE INVENTION

This invention relates to the art of reducing work, typically reducing of billets to rods or bars or rods to wire, by rolling with rolls and has particular relationship to the structure of roll assemblies for this purpose. The rolls may be composed of materials of appropriate types, including iron or steel, capable of effecting the reduction but of particular interest are rolls of metalloids of the tungsten carbide type. The expression "of the tungsten carbide type," as used in this application, primarily means tungsten carbide and its alloys. It also means other hard metalloids such as titanium carbide, molybdenum carbide, tantalum carbide, niobium carbide, and numerous others including borides, silicides, nitrides and the like and their alloys. For a list of these metalloids, reference is made to Goetzel U.S. Pat. No. 2,581,252.

In a roll assembly the rolls are mounted on an arbor and are rotated in engagement with the work to be reduced. In the interest of concreteness, this invention will be described herein as applied to the reduction of rods. To effectively reduce the rods it is necessary that the rolls apply high compressive tangential stresses to the rods and the reactive forces on the rolls are equally high. A high torque tending to rotate each roll on its arbor is thus applied. It is an object of this invention to suppress such rotation.

In accordance with the teachings of the prior art (typically Rackoff, et al., U.S. Pat. Nos. 3,432,902, 3,574,252) lateral force parallel to the arbor axis is applied to the roll by a nut which is screwed onto the arbor and compresses the roll against a flange extending from the arbor. For rolls of large diameter and for the reduction of very hard or tough materials, the force applied by the nut, or which can be applied by a nut, is inadequate. It has also been proposed, in accordance with teachings of the prior art (Hufnagl U.S. Pat. No. 3,793,869, JETNUT hydraulic nuts), to apply the lateral force hydraulically. A piston or pad slideably in an annular cylinder is urged under hydraulic pressure into engagement with a roll. Typically, the piston is sealed against leakage of the hydraulic fluid by an O-ring of neoprene or the like. This prior art practice has not proved satisfactory because of the leakage of the hydraulic fluid and the deterioration of the O-ring gasket by the fluid, particularly at high temperature, typically above 200° to 300° F.

It is an object of this invention to overcome the disadvantages of the prior art and to provide a roll assembly in which the reactive torque applied to the rolls by the work is very high, but the rolls are prevented from rotating relative to the arbor by applying lateral forces to the rolls hydraulically without O-rings subjected directly to the fluid and without experiencing leakage of the hydraulic fluid.

SUMMARY OF THE INVENTION

This invention arises from the realization that the leakage of the hydraulic fluid is caused in large part by the deformation of the walls of the cylinder in which the piston slides under the high-hydraulic pressure. The walls of the cylinder are thin and subject to deformation because of the necessity of providing a cylinder of sufficient volume to accommodate the slideable piston. It has also been realized that deformable membranes transmit pressure with little attenuation. This pressure may be between 10,000 and 20,000 pounds per square inch.

In accordance with this invention the piston and its neoprene seal are eliminated. In the practice of this invention, the high lateral force required is provided by the deflection of a membrane under hydraulic pressure which deforms, but does not rupture under the pressure. A cavity is provided in an annulus or hydraulic nut. The cavity is sealed by a yieldable or deflectable or deformable membrane. An annular shoe is interposed between the membrane and the rolls. When the membrane is deflected by hydraulic pressure, it applies the necessary lateral force to the rolls through the shoe. A thin membrane composed of ductile material is required. It is necessary that the membrane deform under the applied pressure without rupturing or exerting a large counter-force on the pressurizing fluid. The reference to an annular cavity in this application is intended to include within its scope a plurality of cavities in the form of separate segments around the periphery of the annulus.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which:

FIGS. 8 and 9 are respectively a plan view and a view along line IXA—IXA of FIG. 9 of the deflectable diaphragm included in apparatus in accordance with this invention;

FIGS. 10 and 10A are respectively a plan view and a view along line XA—XA of FIG. 10 of a double-tapered spacer used in the practice of this invention;

FIG. 11 is a view in end elevation, as seen from the side of the hydraulic nut, of the shoe used in the practice of this invention;

FIG. 12 is a view in section taken along line XII—XII of FIG. 11 and

FIG. 13 is a fragmental view enlarged of the portion of the shoe in Circle XIII of FIG. 12.

DETAILED DESCRIPTION OF INVENTION

Figure 1:
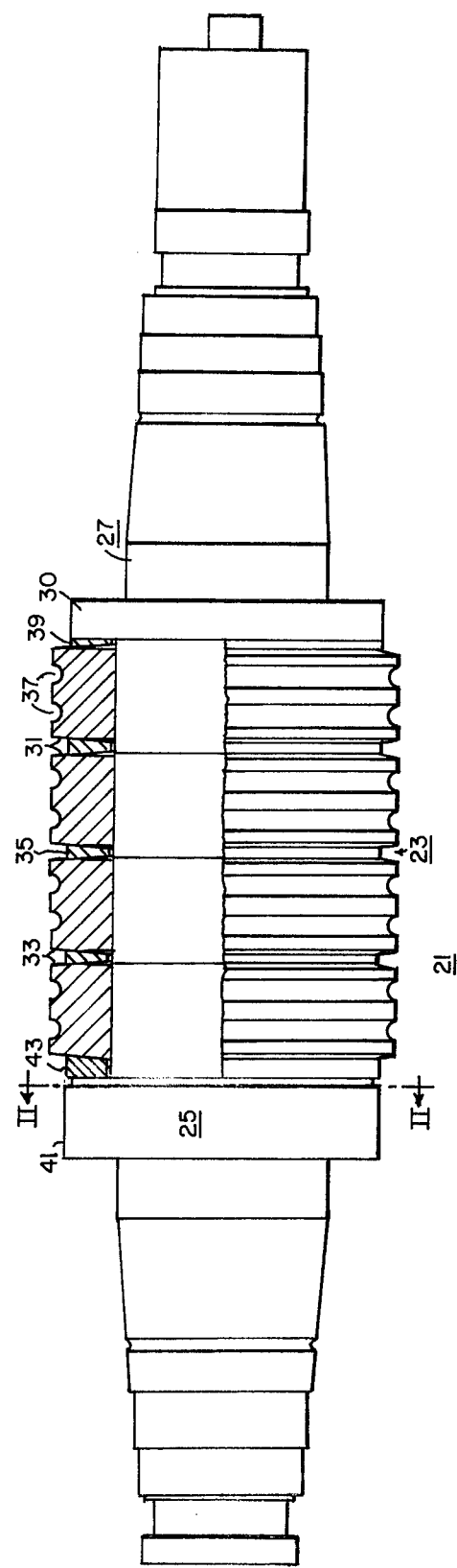
FIG. 1 is a view partly in side elevation and partly in section of an embodiment of this invention.
Figure 2:
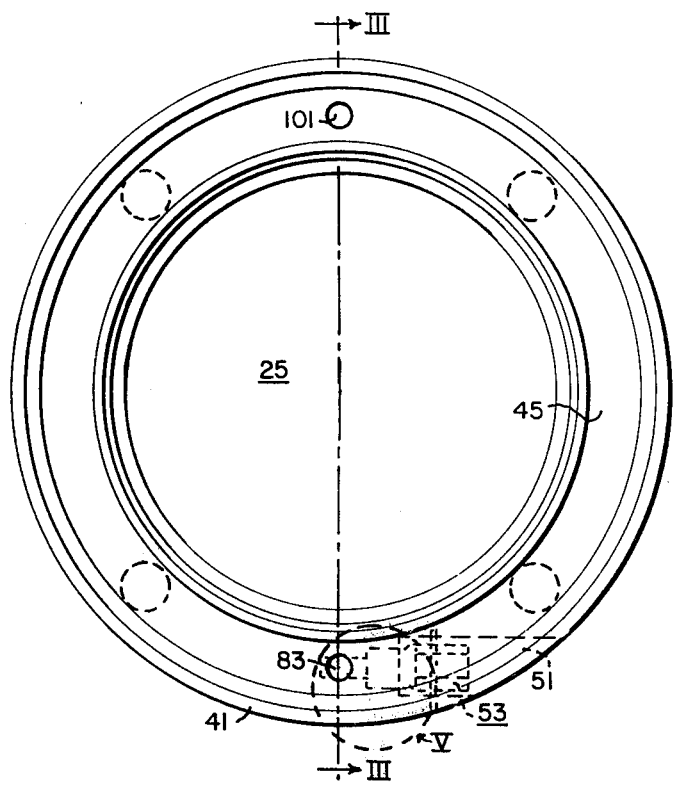
FIG. 2 is a view in end elevation, as seen from the direction of the rolls, of the hydraulic annulus or nut which applies the lateral pressure to the rolls.
Figure 3:
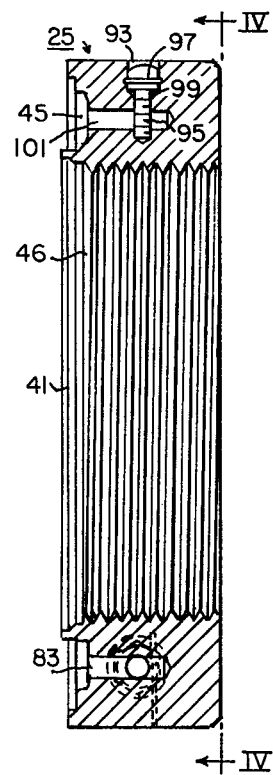
FIG. 3 is a view in section taken along line III—III of FIG. 2.
Figure 4:
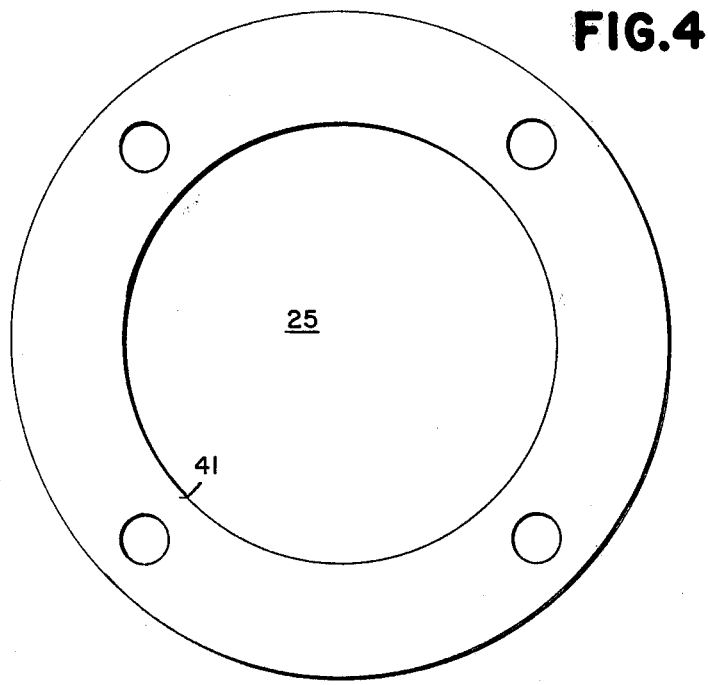
FIG. 4 is a view in end elevation of the hydraulic nut shown in FIG. 2 taken in direction IV—IV of FIG. 3.

The drawings show roll apparatus 21 including a roll assembly 23 to which lateral pressure is applied by an hydraulic-pressure unit 25. This apparatus includes a circularly cylindrical arbor 27 on which the assembly 23 and the unit 25 are mounted in force receiving and transmitting relationship. The arbor 27 is slightly stepped as best shown at 29 in FIG. 7, and has a flange 30 intermediate its ends. The cylindrical surface of the arbor 27 is chromium plated.

The roll assembly 23 includes a plurality of rolls 31 and 33. Typically the rolls 31 are of the tungsten-carbide type and the rolls 33 are composed of iron or other metal appropriate for the work to be rolled. Along their outer periphery, the rolls 31–33 are provided with annular grooves 37 of circular transverse fross section for engaging and reducing the work. Each roll 31–33 is an annulus whose cross section, parallel to its axis, is tapered over a substantial distance from the outer periphery, diverging to a constant thickness near the inner periphery. The taper is small, typically 4 degrees, 46 minutes. Annular spacers 35 are interposed between the adjacent rolls 31–33. The taper of the rolls and the spacers is in such a sense that any axial force impressed between the spacers and the rolls has a radial component towards the arbor, that is, a compressive component. The spacers 35 are tapered oppositely to the rolls having the same taper angle as the taper on the rolls, but diverging towards their outer periphery (FIG. 10). There may be a small difference between the angles of the tapers of the spacers and the angles of the rolls so that the contact region between the spacers and the rolls is away from the axis of the arbor.

A spacer 39 is interposed between the roll 31 adjacent the flange 30 and the flange. This spacer 39 is tapered only on the side abutting the roll 31. The rolls 31–33 are shrunk onto the arbor 27. As shown in FIG. 8, the inner diameters of the rolls 31–33 and the outer diameters of the arbor are properly dimensioned for this purpose. The chromium plating on the surface of the arbor 27 facilitates the mounting of the rolls 31–33 on the arbor 27. The diameters of the arbor and the inner diameters of the rolls are such that the radial pressure of the rolls on the arbor, resulting from the shrinkage, and the resulting hoop stress, is minimized. The spacers 35 and 39 are a sliding fit on the arbor 27. The lateral surfaces of the spacers 35 and 39 and of the rolls are roughened by treatment with a fine grit.

Typically, the steps of the arbor 27 and the inner diameters of rolls 31 and 33 are dimensioned as in inches as shown in Table I, below:

Table I

Figure 7:
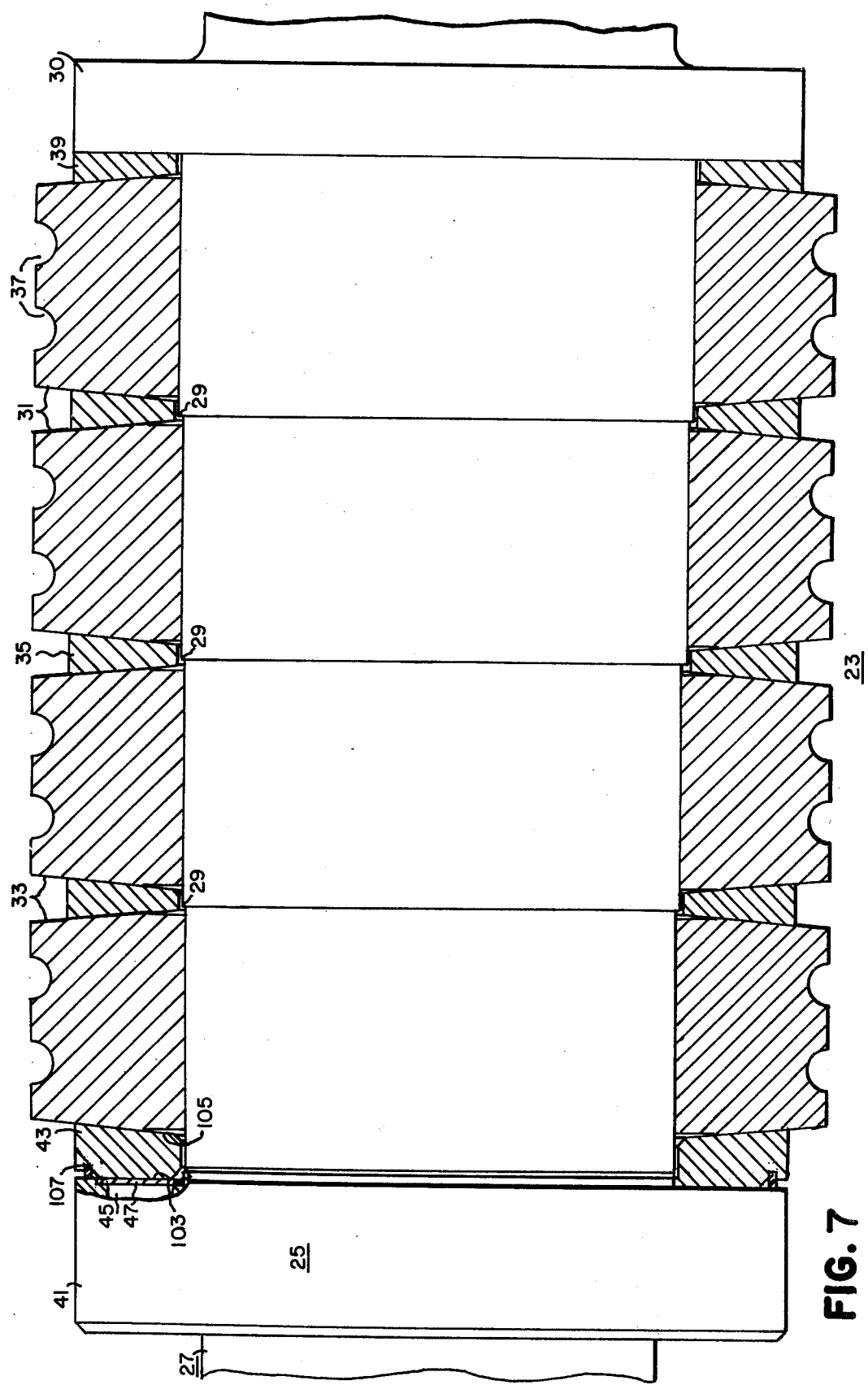
FIG. 7 is a view in longitudinal section of a roll assembly showing important features of this invention.

Left-hand step with reference to FIG. 7

Diameter of arbor — 8.5000 + 0.0000 − 0.0003
Inside diameter of roll 33 — 8.5000 + 0.0002 − 0.0000

Second step from left

Diameter of arbor — 8.5030 + 0.0000 − 0.0003
Inside diameter of roll 33 — 8.5030 + 0.0002 − 0.0000
Width of step — 4.00

Third step from left

Diameter of arbor — 8.5060 + 0.0000 − 0.0003
Inside diameter of roll 31 — 8.5060 + 0.0002 − 0.0000
Width of roll — 4.00

Right-hand step

Diameter of arbor — 8.5090 + 0.0000 − 0.0003
Inside diameter of roll 31 — 8.5090 + 0.0002 − 0.0000
Width of step — 4.25

The taper of the rolls diverging towards the arbor is 4° 46'.

The dimensions of the spacers 35 are as shown in inches and degrees in Table II, below:

Table II

Outside diameter of spacer 12.000 + 0.001 − 0.001
Inside diameter left-hand spacer with reference to F7 − 8.505 + 0.001 − 0.000
Inside diameter second spacer from left — 8.508 + 0.001 − 0.000
Inside diameter third spacer from left — 8.511 + 0.001 − 0.000
Overall width of spacers 6.46 + 0.001 − 0.001
Taper of spacer -- 4° 46' + 0° 10' − 0° 0'

The stepped arbor 27 is of advantage in assembly of a unit including a plurality of rolls. As seen from Table I, the difference between the arbor diameter and the inner diameter of the rolls is small. Under such circumstances difficulty might be encountered in mounting successive rolls on an arbor of constant diameter, particularly where the rolls are shrunk onto the arbor, since a roll to be mounted nearer the flange 30 might stick to the arbor remotely from the flange and prevent the assembly of other rolls. With the arbor stepped, this condition cannot occur since the diameter of the rolls nearer the flange 30 is sufficiently greater the diameters of the outer steps to clear these steps.

Figure 6:
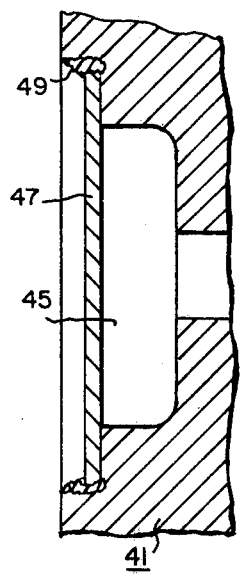
FIG. 6 is a fragmental view in section showing how the membrane is secured over the cavity in the hydraulic nut.

The hydraulic-pressure unit 25 includes an hydraulic nut 41 (FIGS. 1–4) and a shoe 43. The hydraulic nut 41 is an annulus having an annular groover or cavity 45 (FIG. 6). Internally, the nut 41 has a thread 46 which engages a cooperative thread on the arbor 27. For a typical nut the material bounding this cavity 45 is of substantial thickness. The cavity 45 is closed by an annular membrane 47 which is sealed pressure tight to the annulus 41 about the cavity 45. This membrane is thin and is deformable or deflectable. The nut 43 and membrane 47 are both composed of the same material, advantageously A.I.S.I. 304 stainless steel having the following composition in weight percent may be used:

C — 0.08 max
Mn — 2.00 max
Cr — 18 to 20
Ni — 8 to 12
Si — 1.00 max
P — 0.045 max
S — 0.03 max
Fe — Remainder.

The seal is produced by welding the membrane 47 to the cavity 45 with a fusion weld 49. The fusion weld may be produced by arc welding or electron-beam welding or with a laser. It has been found that with the membrane so welded to the annulus 41, a sound pressure-tight seal is produced. Other materials, for example 316 or 347 stainless steel and INCONAL alloy 718, can also advantageously be used for the nut 41 and membrane 47.

Figure 5:
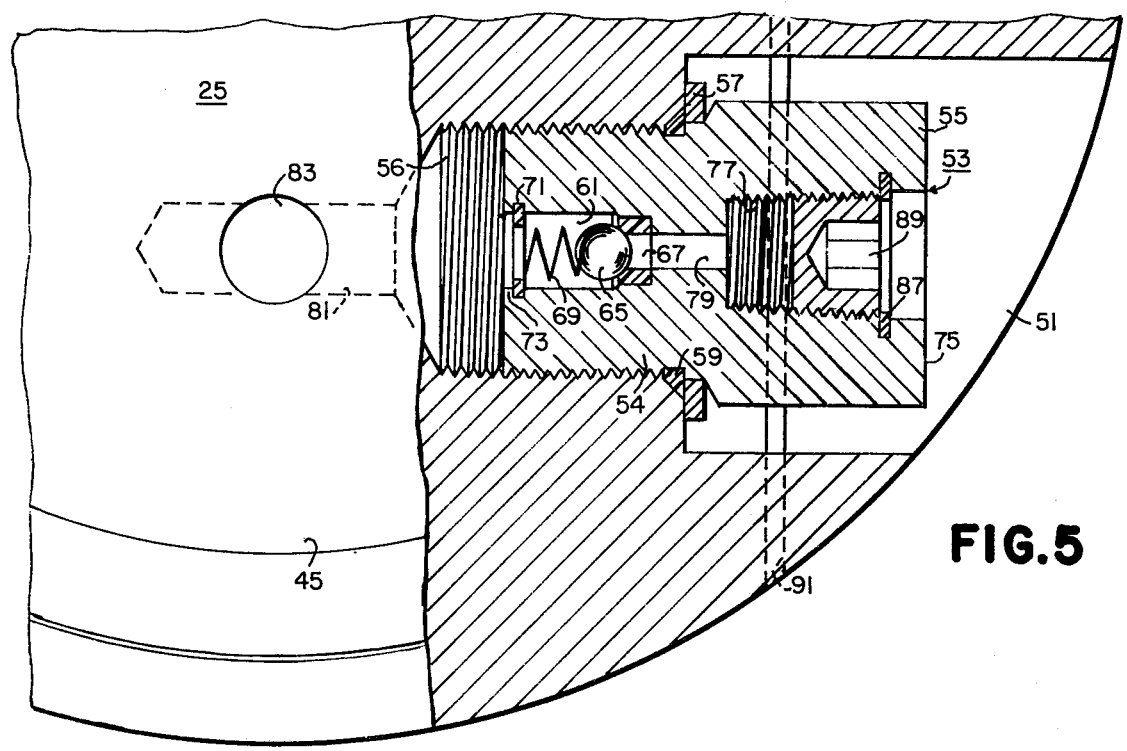
FIG. 5 is a fragmental view enlarged partly in section and partly in side elevation of the portion of FIG. 2 in Circle V showing the mechanism through which the hydraulic fluid is injected into the closed cavity.

The annulus 41 is provided with a cut-out ledge 51 (FIG. 5) in its periphery where an hydraulic-fluid injection mechanism or port 53 is mounted. This mechanism 53 includes a shouldered-body member 55 whose stem 54 is threaded and screwed into a threaded opening 56 in the radial wall, generally tangentially to, the ledge 51. The shoulder of member 55 is engaged by a washer 57. In the stem just below the shoulder the threaded member has a slot. An O-ring 59 is inserted in this slot and is compressed between the washer and the member 55 when the member is screwed into the opening 56. The stem has a reentranted opening 61 (FIG. 5) within which there is a valve. The valve includes a ball 65, a seat 67 for the ball 65, a spring 69 for urging the ball 65 into pressure sealing engagement with the seat 67, and a washer 71 for retaining and compressing the spring 69 and the ball 65. The seat 67 is nested in the outer end of the opening 61. The washer 71 is seated on a ledge in opening 61 near the inner end of the opening 61 and is held by a lip 73 which is formed by crimping the outer boundary of the opening 61. The head 75 of the member 55 has a central threaded opening 77 which communicates with the reentrant opening 61, when the valve 63 is opened, through a hole 79. The reentrant opening 61 is connected to the cavity 45 through the part of the opening 56 inwardly from the valve, through a hole 81 tangential to the annulus 41 and through a hole 83 at right angles to the hole 81 parallel to the axis of the annulus 41.

The opening 77 is sealed by a plug 85 which screws into the opening. The plug 85 is secured by a snap ring 87 which is held in a slot flush with the outer surface of the plug 85. Outwardly, the plug has a hexagonal hole 89 in which a wrench may be inserted to remove the plug. The fluid-injection mechanism is held by a pin (not shown) which passes through a hole 91 drilled through the body of the annulus 41 and off-center through the member 55. The pin is welded in place.

The hole 77 serves for insertion of a fitting (not shown) to inject hydraulic fluid into the cavity 45. For this purpose the plug 85 is removed and the fitting is screwed into hole 77. Advantageously this fluid may be a grease. This has the advantage that the fluid oozes out when there is a leak and does not create a hazard. When fluid under pressure is supplied to the fitting, the ball 65 is retracted from the seat 67 and the fluid flows into cavity 45 through the valve 63 and the holes 81 and 83. When the fluid in the cavity is at the desired pressure (10,000 to 20,000 psi typically), the supply of fluid is interrupted and valve 63 recloses. The fitting is removed from the opening 71 and the plug 85 is screwed in and locked by snap ring 87. The fusion weld 49 has been found to be strong enough to retain the hydraulic fluid under high pressure.

The ledge 51 extends across the thickness of the annulus 41 and the threaded opening 77 of the fluid-injection mechanism is intermediate the side walls of the annulus 41. This structure facilitates ready injection of the fluid.

Diametrically opposite the fluid-injection mechanism 53, the annulus 41 is provided with an opening 93 (FIGS. 2 and 3) for bleeding off air and fluid during assembly and disassembly. The opening 93 is threaded to receive a threaded plug 95 for closing the opening 93. The plug 95 has a head engaged by a snap 97 which is held in a groove in the annulus above the head. Internally, the head of plug 93 engages and compresses an O-ring 99 which is seated in a groove in the opening 93. The opening 93 is in communication with the cavity 45 through a hole 101 parallel to the axis of the annulus.

Typically, the dimensions of the annulus 41 are as shown in inches in Table III, below:

Table III

| | |
|---|---|
| Outside diameter of annulus 41 | 12.00 |

Table III-continued

| | |
|---|---|
| Inside diameter | 7.75 |
| Overall width of annulus | 2.875 |
| Outside diameter of annular seat for membrane 47 | 11.50 |
| Inside diameter of annular seat | 8.56 |
| Outside diameter of annular cavity 45 | 11.00 |
| Inside diameter of annular cavity | 9.00 |
| Depth of annular cavity | 0.25 |
| Axial distance to center of port 53 | 1.50 |
| Radial distance to center of port 53 | 1.0 |
| Axial distance to center of opening 93 | 1.38 |
| Radial distance to center of opening 93 | 1.0 |

Typically, the dimensions of the membrane 47 for an annulus 41 of the dimensions shown in Table III are shown in inches in Table IV, below:

Table IV

Outside diameter of membrane — 11.44 + 0.00 − 0.03
Inner diameter of membrane — 8.56 + 0.03 − 0.00
Thickness of membrane — 0.042

The shoe 43 is an annulus. Its inner diameter is such that it is a slip fit on the arbor 27. On face 103 of the annulus has a flat portion terminating peripherally in a chamfer and this flat portion is engaged by the membrane 47. The flat portion extends completely across the free surface of the membrane 47 and supports the membrane. The other face 105 is tapered oppositely to the taper on the roll 33 and it engages the end roll 33. As pressure is applied to membrane 47, the resulting force is transmitted by the membrane and applied to shoe 43 and through it to the rolls 31–33. The geometry and composition (the ductility) of the membrane is such that the membrane transmits the pressure without rupturing. The rotation of the rolls 31–33 relative to the arbor 27 is suppressed. Near its outer periphery on the side of face 103 the shoe 43 has a circumferential groove in which a rubber ring 107 of square cross-section is seated. The ring 107 is compressed between the annulus 41 and the shoe 43 and prevents dust and other particles from penetrating between the membrane 47 and the surface 103.

Typically, the dimensions of the shoe 43 for use with an annulus 4 whose dimensions are shown in Table III and with a membrane 47 whose dimensions are shown in Table IV are as shown in inches in the following Table V.

Table V

| | |
|---|---|
| Outside diameter of shoe | 12.00 |
| Outside diameter of annular groove for ring 107 | 11.88 |
| Inside diameter of annular groove for ring | 11.50 |
| Radial length of groove | .19 |
| Axial width of groove | .06 |
| Outside diameter of annular surface of shoe engaging membrane 47 | 11.25 |
| Inside diameter of annular surface | 8.75 |
| Chamfer between inner diameter of groove and outer diameter of surface | 45° |
| Chamfer between inner diameter of surface and inner diameter of shoe | 45° |
| Overall width of shoe | .812 |
| Axial width of outer surface of shoe to groove | 688 |
| Taper or right-hand radial surface of shoe with reference to FIG. 12 | 4° 46′ + 0° .10′ − 0° .0′ |
| Chamfer between inner diameter of taper and inner diameter of shoe | 45° |
| Radial distance between inner diameter of taper and inner diameter of shoe | 0.09 |

The dimensions shown in Tables I through V are presented for the purpose of aiding those skilled in the art in practicing this invention and not with any intention of in any way limiting this invention.

In the use of the apparatus, the rolls 31 and 33 and the spacers 35 and 39 are assembled on the arbor 27. The spacers 39 and 35 are each in its turn slid into the arbor 27 and the rolls 31 and 33 are each in its turn shrunk onto the arbor. The shoe 43 is then slid onto the arbor with the tapered face 105 engaging the tapered surface of the end roll 33. The annulus 41 is then screwed tightly onto the arbor 27 compressing the shoe 43 against the end roll 33. Hydraulic fluid under pressure is then injected into the cavity 45 applying force to the shoe 43 and through the shoe to the roll assembly 23. The plug 85 is screwed in to close the opening 77.

While a preferred embodiment of this invention has been disclosed herein, many modifications thereof are feasible. This invention is not to be restricted except insofar as is necessitated by the spirit of the prior art.

We claim:

1. Roll apparatus for reducing work including an arbor, at least one roll mounted on said arbor for rotation therewith, an annulus, having an annular cavity therein, mounted on said arbor coaxial with said roll for rotation with said arbor, a deformable membrane, of a material capable of withstanding high pressure, sealed pressure tight to said annulus about said cavity, forming a closure for said cavity by a weld, and connected to said roll to transmit lateral force to said roll on the deformation of said membrane on the application of pressure thereto, and means, connected to said cavity, for injecting hydraulic fluid under pressure therein to deflect said membrane, whereby rotation of said roll relative to said arbor is suppressed.

2. Roll apparatus for reducing work including an arbor, at least one roll on said arbor, hydraulic means mounted on said arbor and connected to said roll for securing said roll against rotation relative to said arbor, the said hydraulic means including:
  a. An annulus coaxial with said roll having a cavity;
  b. a deformable membrane, of a material capable of withstanding high pressure, coaxial with said roll closing said cavity and welded to said cavity forming a pressure tight seal about said cavity with said annulus; and
  c. a shoe coaxial with said cavity, interposed between said membrane and said roll, in lateral engagement with said membrane on one side and said roll on the opposite side, and means for supplying hydraulic fluid under pressure to said cavity to produce a force on said membrane to deform said membrane whereby said shoe transmits said force from said deformed membrane to said roll.

3. The apparatus of claim 2 including means connected to the shoe and the annulus for suppressing the penetration of foreign matter into the junction between said shoe and membrane.

4. The apparatus of claim 2 including a bleeder opening for the hydraulic fluid penetrating through the annulus radially and is connected to the cavity through an axial channel.

5. The apparatus of claim 2 wherein the annulus includes an opening, for injecting fluid, in the wall of said annulus between the end faces thereof, the said opening being connected through a valve and an axial channel to the cavity.

6. The apparatus of claim 2 wherein the surface of the arbor which is engaged by the roll is chromium plated.

7. The apparatus of claim 2 wherein the roll is tapered in its width, the taper converging in a direction away from the arbor, and the shoe is correspondingly tapered along the surface that engages the roll.

8. The apparatus of claim 1 wherein the hydraulic fluid is a grease.

9. The apparatus of claim 1 wherein the roll is shrunk onto the arbor, but the difference in the outside diameter of the arbor and the inner diameter of the roll is such that the hoop-stress on the roll is minimized.

10. Roll apparatus for reducing work including an arbor, at least one roll mounted on said arbor for rotation therewith, an annulus having a cavity therein, mounted on said arbor coaxial with said roll for rotation with said arbor, an axially deformable membrane, of a material capable of withstanding high pressure, coaxial with said roll sealed pressure tight to said annulus about said cavity by a weld and forming a closure for said cavity so that, on the existance of pressure within said cavity, said membrane reacts to the pressure by deforming axially, said annulus being mounted on said cavity with said membrane in axial pressure-transmitting relationship with said roll, means, connected to said cavity, for injecting a medium therein for applying pressure to deform said membrane, and abutment means, on said mandrel rotatable therewith in axial pressure-receiving relationship with said roll, whereby on the deformation of said membrane, said roll is compressed axially by the pressure applied by said deformed membrane between said membrane and said abutment means and rotation of said roll relative to said mandrel while reducing said work is prevented.

* * * * *